No. 624,970. J. M. & R. F. PHILLIPS. Patented May 16, 1899.
CAR WHEEL.
(Application filed Aug. 1, 1895.)

(No Model.)

Witnesses:
J. B. McGirr.
W. Darrell.

Inventors
John M. Phillips
and Robert F. Phillips
by Connolly Bros.
Att'ys

UNITED STATES PATENT OFFICE.

JOHN M. PHILLIPS AND ROBERT F. PHILLIPS, OF CARRICK, PENNSYLVANIA.

CAR-WHEEL.

SPECIFICATION forming part of Letters Patent No. 624,970, dated May 16, 1899.

Application filed August 1, 1895. Serial No. 557,847. (No model.)

*To all whom it may concern:*

Be it known that we, JOHN M. PHILLIPS and ROBERT F. PHILLIPS, citizens of the United States, residing at Carrick P. O., in the county of Allegheny and State of Pennsylvania, have invented certain new and useful Improvements in Car-Wheels; and we do hereby declare the following to be a full, clear, and exact description of the invention, such as will enable others skilled in the art to which it appertains to make and use the same.

Our invention has relation to car-wheels, and has for its object the provision of novel means for attaching the wheel to the axle, and has for its further object the provision of novel means for oiling the wheel and for excluding dust and dirt from the interior of the hub.

Our invention consists in the novel construction, combination, and arrangement of parts hereinafter described and claimed.

Figure 1:
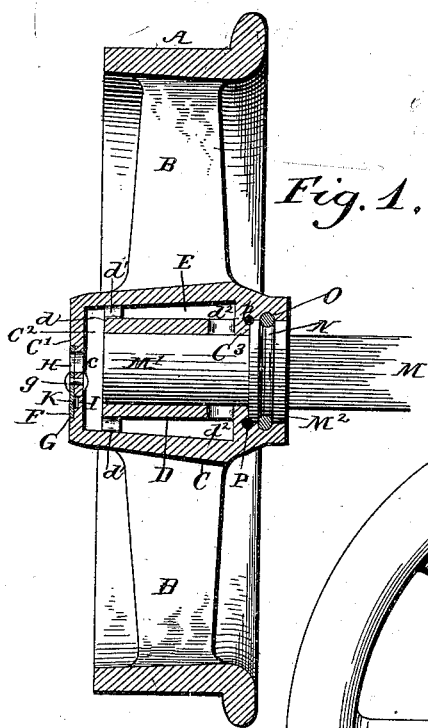
Figure 3:
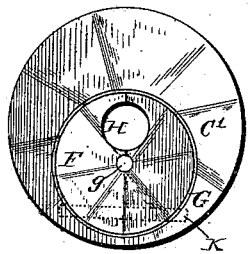
Figure 2:
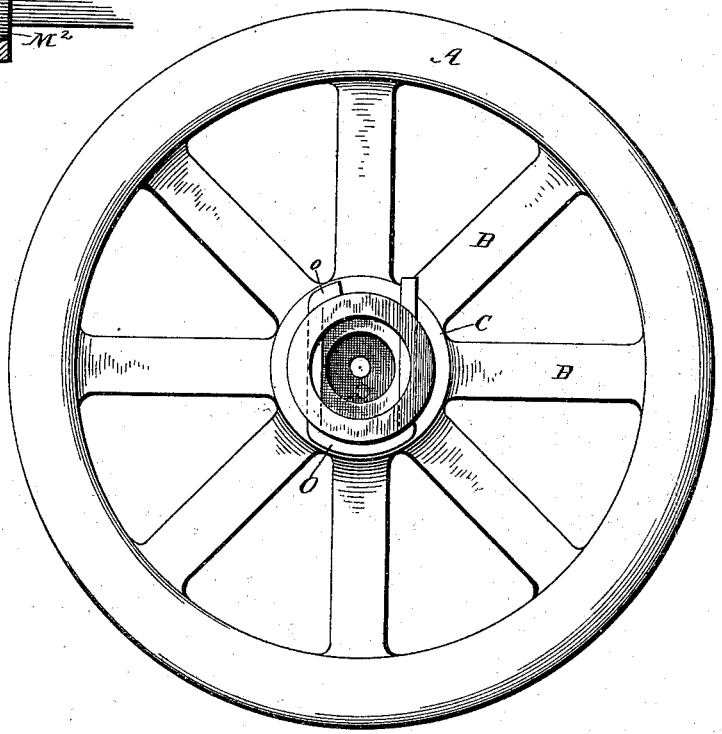
Figure 4:
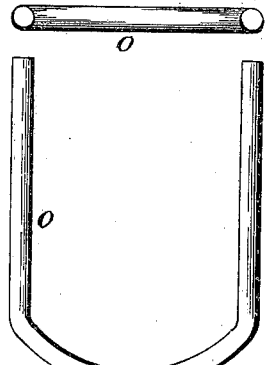

Referring to the accompanying drawings, Figure 1 is a vertical sectional view of a wheel and part of the axle of a car constructed according to our invention. Fig. 2 is an elevation looking at the back of the wheel. Fig. 3 is a front view of the hub, and Fig. 4 is a detailed view of the staple which is employed in connecting the wheel and axle.

A designates the rim of the wheel, B B the spokes, and C the hub.

The hub C is hollow and has cast integral with it a cylindrical sleeve D, between the exterior of which and the interior of the hub a space E is formed which serves to allow the passage of the oil from end to end of the hub, the internal sleeve D being united to the hub C by a partition $d$, in which are formed openings $d'$ $d'$ for the passage of the oil, while the sleeve D has passages $d^2$ $d^2$ at its rear which permit of the passage of oil from the space E to the interior of the sleeve. The hub is cast with a solid front C', between which and the end of the sleeve D a space $C^2$ is formed which serves to receive oil for the lubrication of the hub. A small hole $c$ is drilled at the center of the front C' of the hub, and through this hole the oil necessary for the lubrication of the wheel is poured as required. A circular plate F is arranged in a circular depression G, formed in the front C' of the hub, and the said plate is secured in the depression G by a rivet $g$, and said rivet is loose enough to permit the plate to be turned. A hole H in the plate F coincides at one position of the plate with the hole $c$ in the end C' of the hub, and when the holes $c$ and H coincide oil may be poured into the interior of the hub; but when the plate is turned around so that the hole H is no longer opposite the hole $c$ the plate serves to close the opening $c$, and thus prevent access of dirt or dust to the interior of the hub. At the bottom of the recess or socket G a straight slot or groove I is cut, and in this slot or groove a flat spring K is placed, said spring being bent or bowed at its center, so as to constantly press outwardly against the plate F, the purpose of said spring being to keep the plate F from accidentally turning when the wheel is in motion. The pressure of the spring K of the wheel is sufficient to prevent the accidental turning of the plate F by the jarring or rotation of the wheel and is not so great as to prevent the plate being readily turned by the fingers when it is desired to oil the wheel.

M designates the axle which is employed in connection with our improved wheel. Said axle has a rounded end M', that fits and turns in the sleeve D, and is provided with a collar $M^2$, which fits into a recess in the rear of the hub and abuts against a flange $C^3$ on the interior of the hub. A circular groove N is formed in the collar $M^2$ of the axle, and the rear of the hub C has tangential grooves and holes bored through it corresponding in position to the groove N, and a staple O is passed through these holes and fits into the groove N and serves to hold the wheel upon the axle, while permitting the wheel to turn freely upon the axle. After the staple O has been placed in position one of its ends is bent over, as shown at $o$, which serves to retain the staple in place.

If for any reason it is desired to remove the wheel from the axle, the bent end $o$ of the staple O may be either straightened up or cut off, and the staple can then be drawn out and the wheel removed from the axle. The staple being in such position that it is exposed to view, there is less danger of the staple becoming worn to a dangerous degree than where the staple or other means used for attaching the wheel to the axle is concealed within the hub.

The wheel and axle constructed as described are substantially dust-proof, and as an additional precaution against the admission of dust through the rear of the hub we provide a circular groove P at the point of juncture of the sleeve $M^2$ and flange $C^3$, which groove is filled with suitable packing $p$, as shown.

Having described our invention, we claim—

A car-wheel having integral therewith, a hub C open at its inner end and closed at its outer end, and formed with an internal sleeve D having a partition $d$ at one end, with oil-openings $d'$, an oil-chamber E surrounding said sleeve, with radial oil-openings $d^2$, an oil-space $C^2$ at the outer end of the hub, an opening in said end having a rotary closing-plate an annular flange $C^3$ at the inner end of the sleeve D, and the opening at the inner end of the hub, having an interior tangential groove, and tangential openings in its wall coinciding with said groove, in combination with an axle M having a collar $M^2$ which abuts against the flange $C^3$, and is grooved at N to match the groove in the hub and a key or staple which fits into said tangential openings and keys the hub and axle in position while allowing the wheel to rotate, all substantially and for the purpose described.

In testimony whereof we have affixed our signatures in presence of two witnesses.

JOHN M. PHILLIPS.
ROBERT F. PHILLIPS.

Witnesses:
G. J. BLEICHNER,
D. MCCOY.